United States Patent
Liepelt et al.

(10) Patent No.: US 10,384,606 B2
(45) Date of Patent: Aug. 20, 2019

(54) METHOD FOR ASSEMBLING SINGLE IMAGES RECORDED BY A CAMERA SYSTEM FROM DIFFERENT POSITIONS, TO FORM A COMMON IMAGE

(71) Applicant: Robert Bosch GmbH, Stuttgart (DE)

(72) Inventors: David Liepelt, Stuttgart (DE); Raphael Cano, Stuttgart (DE); Dennis Hucker, Marxzell (DE); Jose Domingo Esparza Garcia, Stuttgart (DE); Maria-Jesus Esparza, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/124,649

(22) PCT Filed: Jan. 20, 2015

(86) PCT No.: PCT/EP2015/050978
§ 371 (c)(1),
(2) Date: Sep. 8, 2016

(87) PCT Pub. No.: WO2015/135670
PCT Pub. Date: Sep. 17, 2015

(65) Prior Publication Data
US 2017/0018085 A1    Jan. 19, 2017

(30) Foreign Application Priority Data
Mar. 10, 2014   (DE) .................. 10 2014 204 303

(51) Int. Cl.
*G06K 9/00*   (2006.01)
*B60R 1/00*   (2006.01)
(Continued)

(52) U.S. Cl.
CPC .............. *B60R 1/00* (2013.01); *G06T 3/4038* (2013.01); *G06T 5/006* (2013.01); *G06T 5/50* (2013.01);
(Continued)

(58) Field of Classification Search
None
See application file for complete search history.

(56) References Cited

U.S. PATENT DOCUMENTS

| 6,680,689 B1 * | 1/2004 | Zoratti | B60Q 9/008 |
| | | | 180/169 |
| 6,793,350 B1 * | 9/2004 | Raskar | G03B 37/04 |
| | | | 353/121 |

(Continued)

FOREIGN PATENT DOCUMENTS

| DE | 103 03 015 A1 | 8/2004 |
| DE | 10 2011 082881 A1 | 3/2013 |

(Continued)

OTHER PUBLICATIONS

International Search Report for PCT/EP2015/050978, dated Apr. 10, 2015.

*Primary Examiner* — Fred H Hu
(74) *Attorney, Agent, or Firm* — Norton Rose Fulbright US LLP; Gerard Messina

(57) ABSTRACT

A method for assembling single images recorded by a camera system from different positions, to form a common image, including providing a first projection surface having a first geometric shape and a second projection surface having a second geometric shape; every point of the first projection surface having an associated point on the second projection surface; acquiring positional information that describes a configuration of objects shown in the single images relative to the camera system; reshaping the first geometric shape of the first projection surface on the basis
(Continued)

of the acquired positional information; assigning texture information pertaining to the single images to surface regions of the reshaped first projection surface; transferring texture information from the points of the first projection surface to the respective, associated points of the second projection surface; and producing the common image from a view of the second projection surface.

18 Claims, 3 Drawing Sheets

(51) Int. Cl.
    *G06T 3/40*     (2006.01)
    *G06T 5/00*     (2006.01)
    *G06T 5/50*     (2006.01)
    *G06T 7/33*     (2017.01)
    *G06T 7/73*     (2017.01)

(52) U.S. Cl.
    CPC ............ *G06T 7/344* (2017.01); *G06T 7/75* (2017.01); *B60R 2300/105* (2013.01); *B60R 2300/301* (2013.01); *B60R 2300/303* (2013.01); *G06T 2207/10004* (2013.01); *G06T 2207/20221* (2013.01); *G06T 2207/30261* (2013.01)

(56) References Cited

U.S. PATENT DOCUMENTS

2014/0118341 A1*   5/2014   Shimizu ................ G06T 3/4038
                                                                           345/419
2015/0130942 A1*   5/2015   Fujita .................... B60R 1/00
                                                                           348/148

FOREIGN PATENT DOCUMENTS

| EP | 2 192 552 A1 | 6/2010 | |
|----|----|----|----|
| JP | 2006135797 A | 5/2006 | |
| JP | 2008177856 A | 7/2008 | |
| JP | 2009118415 A | 5/2009 | |
| JP | 2013074423 A | 4/2013 | |
| JP | WO 2013175753 A1 * | 11/2013 | ............ B60R 1/00 |
| WO | 2013/175753 A1 | 11/2013 | |

* cited by examiner

METHOD FOR ASSEMBLING SINGLE IMAGES RECORDED BY A CAMERA SYSTEM FROM DIFFERENT POSITIONS, TO FORM A COMMON IMAGE

FIELD OF THE INVENTION

The present invention relates to a method for assembling single images recorded by a camera system from different positions, to form a common image.

BACKGROUND INFORMATION

Such methods are used in driver assistance systems, for example. Driver assistance systems are directed to assisting the driver of a vehicle during vehicle motion.

Such an assistance may be accomplished in the following ways:
  displaying the surroundings in the close range of the vehicle to the driver in order to avoid collisions with obstacles that are not located in the driver's field of view;
  taking over some of the driver's activities in order to enhance riding comfort during vehicle motion;
  monitoring the driver's activities and intervening in the case of a dangerous situation; and/or
  automated driving without requiring a driver on board the vehicle.

The present invention is especially directed to imaging a composite view in a surround view system.

In systems having a plurality of cameras, it proves to be a difficult task to assemble a plurality of camera images. Since images are recorded by sensors in different positions, the changes in perspective result in images that differ from one another. The more distant two sensors are from one another, the greater are the shifting perspectives, and the more relatively dissimilar the two images are.

Different procedures for assembling a plurality of camera images are formulated to produce a common view of a plurality of images. These images are typically captured either by various simultaneously active sensors or by an individual sensor that is active at different positions at successive points in time.

The current state of the art for assembling images of different views is based on a distance estimation that provides a means for correcting the effects of substantial differences among the single images. The distances may be estimated directly from the image data, or result from a fusion with further sensor data (for example, from an ultrasound, LiDAR or radar system).

A method for displaying the area surrounding the motor vehicle in a specific view is discussed in German Patent Application DE 102011082881 A1. It provides for using at least one camera of a vehicle camera system to record first image information of the area surrounding a motor vehicle. In this method, spatial information, such as depth information or spatial coordinates, is determined relative to the recorded first image information. Using the spatial information, the first secondary information is transformed depending on the desired view. Finally, on the basis of the secondary image information, the area surrounding the motor vehicle is displayed in the desired view.

In surround view systems, an image based rendering (IBR) produces each composite view, real images being used to provide an assumed projection surface with textures. This projection surface is typically described using distance information provided by the various sensors.

It turns out that when the distance information is used to deform the projection surface, the dissimilarity between two images is reduced by projecting similar points close to each other.

Nevertheless, one approach is to dynamically change the projection surface, thereby often producing sharp edges that result in an unfavorable visual effect.

SUMMARY OF THE INVENTION

The method according to the present invention for assembling single images recorded by a camera system from different positions, to form a common image, includes providing a first projection surface having a first geometric shape and a second projection surface having a second geometric shape, every point of the first projection surface having an associated point on the second projection surface; acquiring positional information describing a configuration of objects shown in the single images relative to the camera system; using the acquired positional information to reshape the first geometric shape of the first projection surface; assigning texture information pertaining to the single images to surface regions of the reshaped first projection surface; transferring texture information from points of the first projection surface to the respective, associated points of the second projection surface; and producing the common image from a view of the second projection surface. The first and the second projection surfaces are thereby virtual surfaces.

This is advantageous since it makes it possible to lessen significant disparities among images in the join regions thereof. Moreover, more fluid visualization effects are achieved due to the minimal, respectively no geometric change in the second projection surface. Image artefacts are decreased. Producing the common image also reduces computational outlay.

The further descriptions herein describe further embodiments of the present invention.

It is thereby advantageous when the first projection surface is composed of a plurality of polygons or primitives, each of whose positions is defined by a vector or a vertex. It is thus possible to minimize the required processing power. This also makes it possible to readily adapt the geometric resolution of the first projection surface.

It is also advantageous when the single images form an image of an overlapping region that shows a common region in the surrounding field of the camera system. Such an overlapping region makes it possible to achieve an especially fluid visual transition between two single images.

It is likewise advantageous when the positional information is recorded concurrently with the single images. This minimizes any offset between the geometric and the graphic data and thereby prevents image artifacts created by such an offset.

The camera system may be a surround view system of a vehicle. This is advantageous since the requisite sensors for recording the positional information are often already present in such a surrounding field.

It is also advantageous when the single images are recorded with an offset in time by the same camera of the camera system. This reduces the number of required cameras and derives a further cost advantage.

Likewise advantageous is an image processing unit or a computer that is adapted for implementing the inventive method. Such an image processing unit has all the advantages of the method according to the present invention. A unit is also thereby devised that makes expanding an already existing camera system readily possible.

Also advantageous is a computer program product that includes program routines which, when loaded into a computer, are suited for implementing the method according to the present invention. Such a computer program product provides a simple way for expanding existing image processing units.

Exemplary embodiments of the present invention are described in detail in the following with reference to the accompanying drawings.

DETAILED DESCRIPTION

Figure 1:
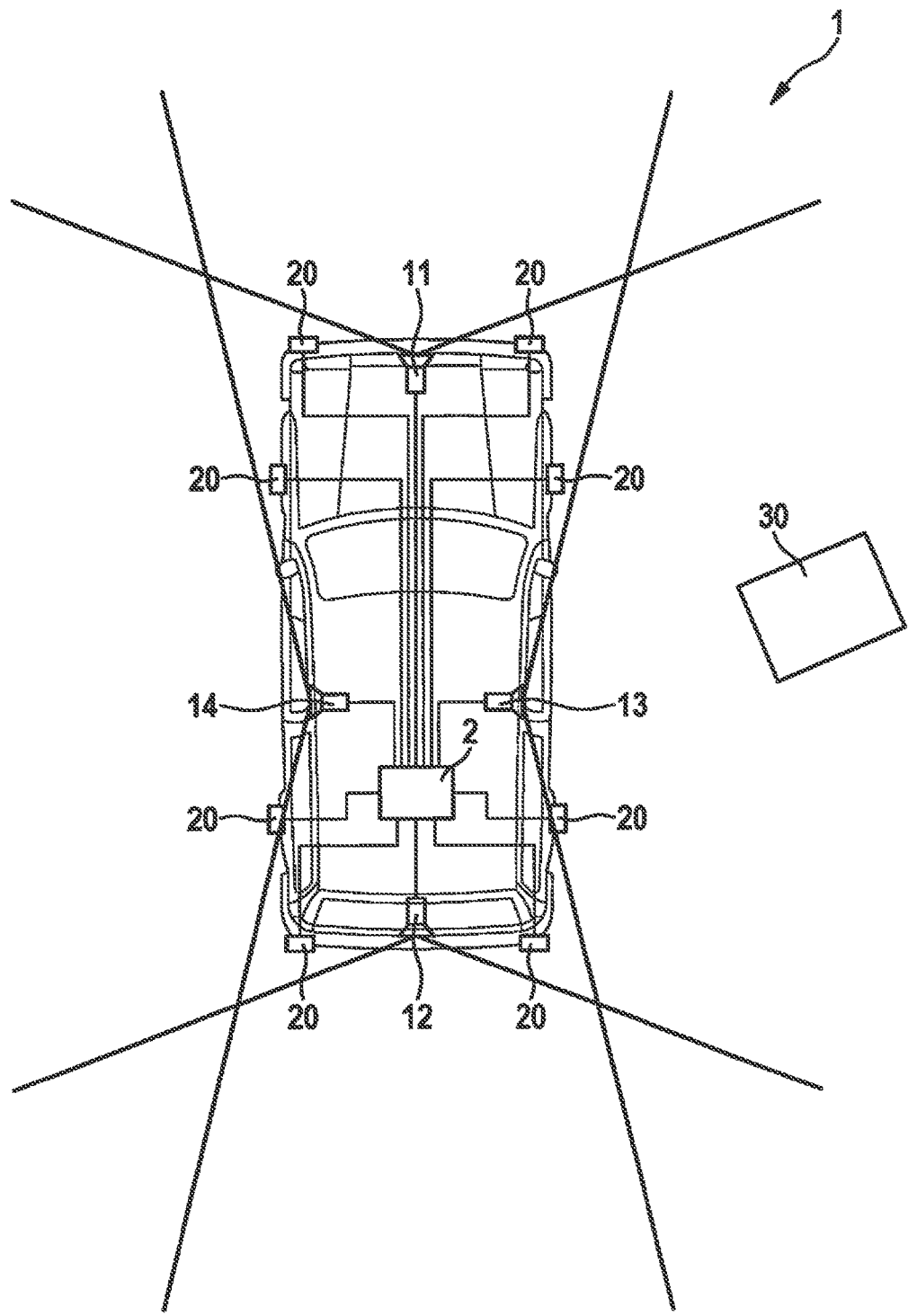
FIG. 1 shows an image processing unit that is adapted for implementing the inventive method.

FIG. 1 shows a vehicle 1 having an image processing unit 2 that is adapted for implementing the inventive method.

Vehicle 1 is equipped with a surround view system that includes a camera system. The camera system includes four cameras 11 through 14 that capture the complete surrounding field of vehicle 1: a first camera 11, whose optical axis along a longitudinal axis of the vehicle is directed to the front; a second camera 12, whose optical axis along a longitudinal axis of the vehicle is directed to the rear; a third camera 13, whose optical axis along a transversal axis of the vehicle is directed to the right; and a fourth camera 14, whose optical axis along a transversal axis of the vehicle is directed to the left. Cameras 11 through 14 each capture single images which, in each particular case, show a portion of the surrounding field of the vehicle that is located in a field of view of the corresponding camera. The fields of view of adjacent cameras overlap. Thus, for example, a region to the right in front of the vehicle is captured by first camera 11, as well as by third camera 13. Therefore, each captured single image of a camera 11 through 14 forms an image of an overlapping region that shows a region in the surrounding field of the camera system that is also recorded by the respective, adjacent camera. The single images captured by cameras 11 through 14 are transmitted in each instance via an image data line to image processing unit 2.

The vehicle is also equipped with a distance sensor system. It includes a plurality of ultrasonic sensors 20. They are mounted on an outer periphery of vehicle 1 and spaced apart in a way that allows them, collectively, to capture the entire surrounding field of vehicle 1 and thus to record positional information pertaining to objects 30 located in the surrounding field of vehicle 1. Since both the camera system, and thus cameras 11 through 14, as well as the distance sensor system, and thus ultrasonic sensors 20, are each placed in a fixed position on vehicle 1, the distance sensor system is able to record positional information pertaining to objects 30 relative to the camera system. The positional information recorded by ultrasonic sensors 20 is transmitted in each instance via a data line to image processing unit 2. Image processing unit 2 is an electronic processing unit.

Image processing unit 2 performs the inventive method for assembling single images to form a common image. A fundamental idea is thereby that a duplicate set of geometrically shaped projection surfaces is used, one of the projection surfaces not being rendered, rather merely being used to assist in the assembling of the single images. This supporting, geometrically shaped projection surface is associated with a one-to-one relationship with a visible projection surface in the sense that it has the same number of vertices and connections between them.

In this regard, a first projection surface G' having a first geometric shape and a second projection surface G having a second geometric shape are initially provided in a first step. Both first projection surface G', as well as second projection surface G are geometric constructs in a virtual three-dimensional space, whose geometric shape may be represented by vectors, for example. In the simplest case, the virtual three-dimensional space is an image of the actual space around the vehicle. This means that every location point in the virtual, three-dimensional space has assigned thereto a location point in the actual space around the vehicle. First projection surface G' and second projection surface G may each be defined, for example, by a plurality of polygons and, in each case, by a corresponding vertex.

Figure 2:
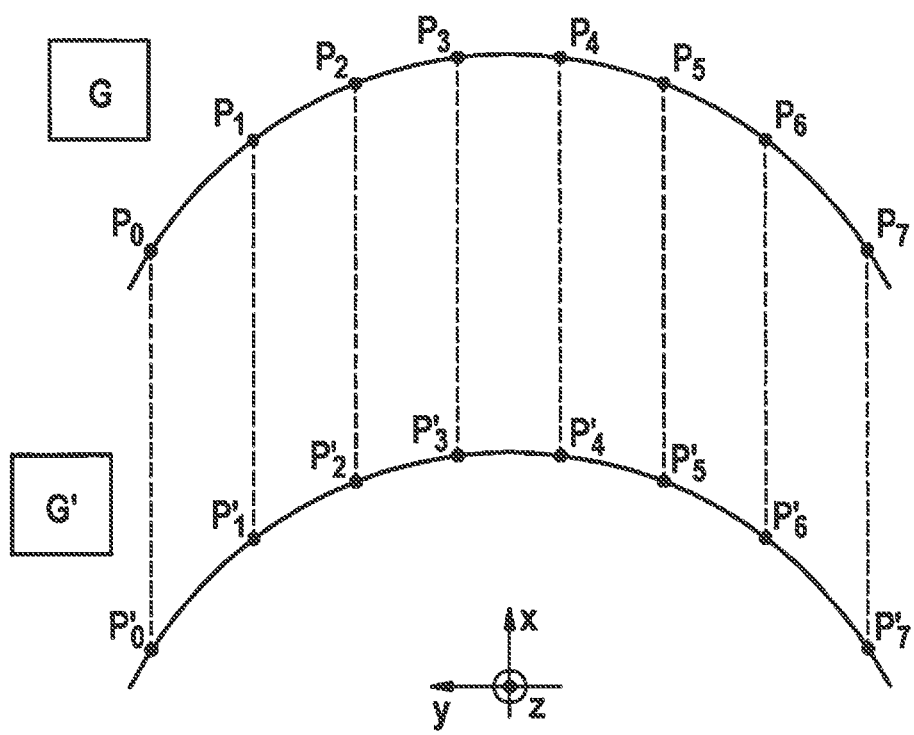
FIG. 2 is a representation of a first and second projection surface.

FIG. 2 shows a representation of first projection surface G' and of a second projection surface G in the virtual three-dimensional space. For the sake of simplicity, merely a two-dimensional plane of the virtual three-dimensional space is thereby represented in which first projection surface G' and second projection surface G are spanned. First projection surface G' is composed of a plurality of points $P'_0$ through $P'_7$. Second projection surface G is composed of a plurality of points $P_0$ through $P_7$. It is self-evident that the number of points is not limited to the eight points described here, but rather may be adapted to the particular requirements. Associated with each point $P'_0$ through $P'_7$ of first projection surface G' is a point $P_0$ through $P_7$ on second projection surface G. In the example shown in the figure, point $P_0$ of second projection surface G is assigned to point $P'_0$ of first projection surface G'. Point $P_2$ of second projection surface G is assigned to point $P'_0$ of first projection surface G'. Point $P_2$ of second projection surface G is assigned to point $P'_2$ of first projection surface G'. Point $P_3$ of second projection surface G is assigned to point $P'_3$ of first projection surface G'.

The geometric shape of the second projection surface is thereby selected in a way that allows every point of the second projection surface to be seen from a point in the virtual three-dimensional space that is a position of a virtual camera. The virtual camera is thereby a camera that would capture an image that corresponds to the common image assembled from single images. Thus, the second projection surface could extend spherically around the position of the virtual camera, for example; the position of the virtual camera not necessarily being located in the center of this sphere. In other examples, however, the geometric shape of second projection surface G may also be defined in other ways. Thus, it could likewise be a different round or square shape that completely or only partially surrounds vehicle 1 or is specially adapted to the region captured by cameras 11 through 14.

In a second step S2, the positional information that describes a configuration of objects 30 shown in the single images relative to the camera system, is captured by the distance sensor system and transmitted to image processing unit 2.

In a third step S3, the first geometric shape of first projection surface G' is reshaped on the basis of the acquired positional information. This may be accomplished, for example, by initially likewise transferring the positional information to the virtual three-dimensional space in which first projection surface G' is also spanned.

Figure 3:
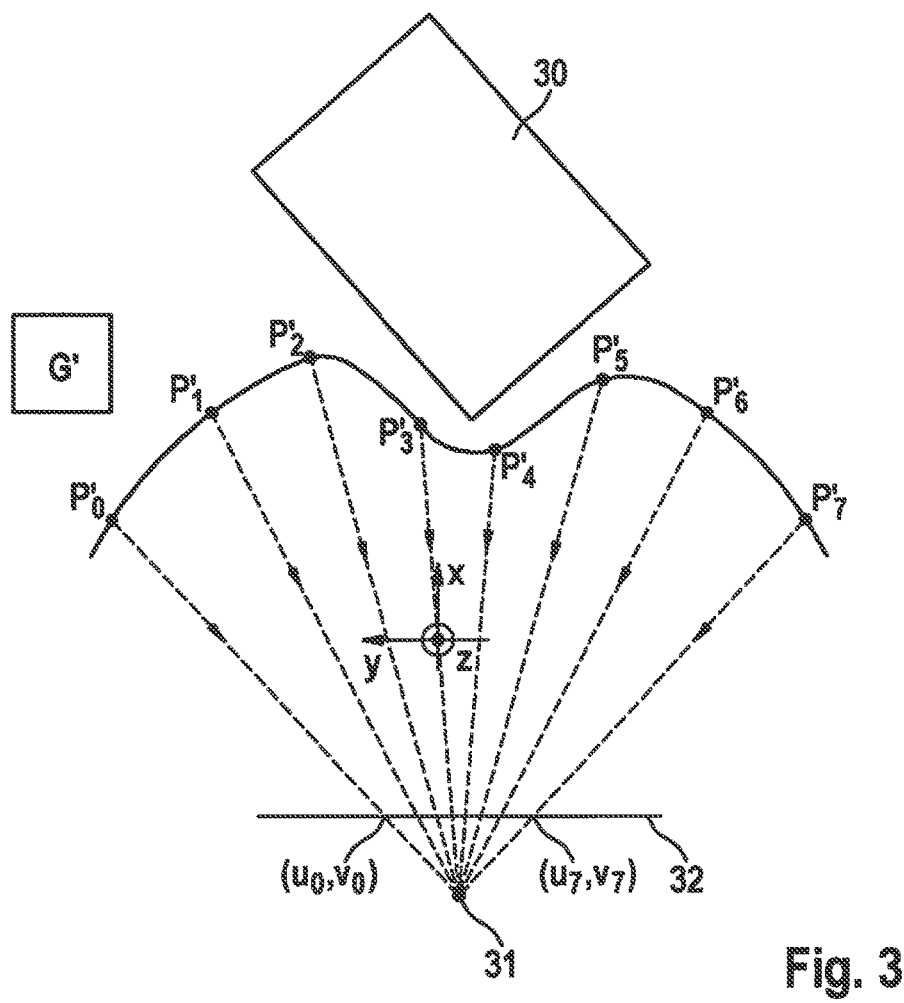
FIG. 3 is a representation of a reshaped first projection surface.

This is shown exemplarily in FIG. 3. FIG. 3 is a representation of a reshaped first projection surface G'. An object 30 shown in a single image was transferred into the virtual three-dimensional space using the positional information pertaining to this object 30. This is possible since every location point in the virtual, three-dimensional space has assigned thereto a location point in the actual space around the vehicle.

In the exemplary situation described here, object 30 is an object that is located to the right, next to vehicle 1. Object 30 is captured by ultrasonic sensors 20, and the positional information that describes the shape of object 30 and the position of object 30 relative to vehicle 1 and relative to the camera system, is transmitted to the image processing unit. There, an image of object 30 is produced in the virtual three-dimensional space.

The geometric shape of first projection surface G' is reshaped by reducing the distances of all points disposed on the first projection surface relative to the position of the virtual camera in a way that allows them to come to rest on a surface of object 20 adjusted to one of the virtual cameras. In this context, it is apparent that such a deformation of first projection surface G' would even be possible when, for example, the side of object 30 facing away from vehicle 1 and thus the complete shape of the object is not fully capturable by the distance sensor system. The point positions are modified, in particular by altering the position of the polygon upon which a point is located; thus, by changing an associated vertex. Therefore, the distance information is used to deform the supporting geometric shape of first projection surface G'.

In a fourth step S4, texture information pertaining to the single images is assigned to surface regions of reshaped first projection surface G'. In this example, texture information corresponds to color information obtained from a single image of one of cameras 11 through 13.

This is likewise shown exemplarily in FIG. 3. Here, optical center 31 of third camera 13 is shown in the virtual three-dimensional space. Since every location point in the virtual, three-dimensional space has a location point in the actual space around the vehicle assigned thereto, the position of third camera 13 of the camera system in the virtual three-dimensional space is likewise known. Disposed upstream of optical center 31 of third camera 13 in a camera projection surface 32 is the single image captured by third camera 13. In the actual space, this camera projection surface 32 corresponds to the image sensor of third camera 13 and thus also to the single image captured by third camera 13. Each point of the single image of third camera 13 is a point on camera projection surface 32. These points may be described by coordinates (u,v), for example, which, in turn, are associated with color information. Camera projection surface 32 is disposed between object 30 and optical center 31 of third camera 13. At the same time, this means that object 30 is shown in the single image of third camera 13.

Color information is assigned to each point $P'_0$ through $P'_7$ of first projection surface G' by drawing a straight line between particular point $P'_0$ through $P'_7$ and optical center 31 of third camera 13, and by assigning the color information of the point of the single image to particular point $P'_0$ through $P'_7$ through which the respective, associated straight line extends. Thus, assigned to each point $P'_0$ through $P'_7$ are coordinates (u,v) from the single image of third camera 13 which, in turn, are associated with color information.

First coordinates $(u_0,v_0)$ from the single image of third camera 13 are assigned to first point $P'_0$; second coordinates $(u_1,v_1)$ from the single image of third camera 13 are assigned to second point $P'_1$; third coordinates $(u_2,v_2)$ from the single image of third camera 13 are assigned to second point $P'_2$, etc. Thus, color information and, therefore, a texture are assigned to each of the points of first projection surface G'.

In a case where object 30 is shown in the single images of two cameras of the camera system, since it is located in an overlapping region of the single images of these cameras, it is possible for texture information from both cameras to be assigned to individual points of the first projection surface. If object 30 were shown both in a single image of third camera 13, as well as in a single image of first camera 11, for example, then this region could have either texture information (thus color information) of the single image of first camera 11 or of the single image of third camera 13 assigned thereto. In this case, a camera could be prioritized, or a color value, which is formed from a mean value of the two possible color values, is assigned to such a point.

It is not absolutely necessary to individually compute the texture information for each individual point. In the same way, regions of the single image and thus the color information of a plurality of points may also be assigned in each case to a polygon of first projection surface G', respectively to a vertex associated with the polygon.

In a fifth method step, the texture information from points of the first projection surface is transferred to the respective, associated points of the second projection surface. This is accomplished in that coordinates (u,v) associated with a point of first projection surface G' or at least the color information associated with these coordinates is transferred to the corresponding point of second projection surface G. Thus, the texture information was transferred to second projection surface G that was not subject to any deformation.

In a case where the texture information is not computed individually for each individual point, rather from polygons, the color information of a polygon of first projection surface G' is transferred in each case to a corresponding polygon of second projection surface G.

Figure 4:
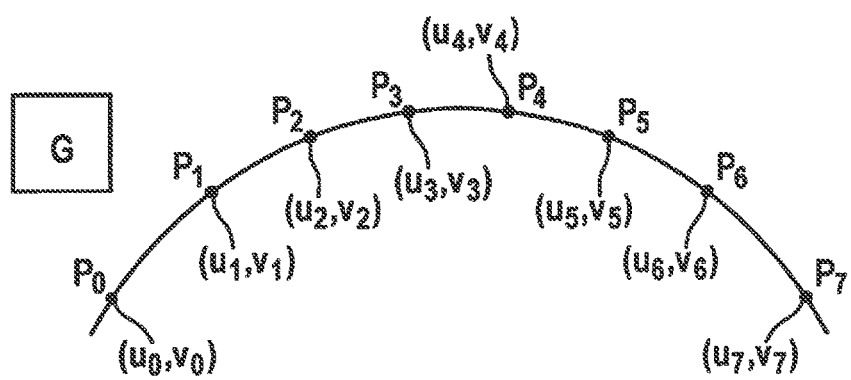
FIG. 4 is a representation of the second projection surface including transferred texture information.

This is illustrated in FIG. 4. FIG. 4 is a representation of second projection surface G including transferred texture information. It is apparent that first coordinates $(u_0,v_0)$ from the single image of third camera 13 are assigned to first point $P_0$; that second coordinates $(u_1,v_1)$ from the single image of third camera 13 are assigned to second point $P_1$; that third coordinates $(u_2,v_2)$ from the single image of third camera 13 are assigned to third point $P_2$, etc. Thus, color information and, therefore, a texture are assigned to each of points $P_0$ through $P_7$ of second projection surface G.

In a sixth method step, the common image is produced from a view of the second projection surface. Here, this view is a view from the position of the virtual camera. This means that an image, that the virtual camera would record from the position thereof in the virtual three dimensional space, is computed or rendered only if second projection surface G, but not first projection surface G' is visible thereto. Thus, second projection surface G may be considered as a visible projection surface that is shown completely or partially. It should be noted here that the position of the virtual camera at this point in time may be newly selected as needed.

Finally, the common image is output to an image output device, for example, to a monitor in the interior of vehicle 1.

In summary, distance information, taken from various sensor data, is initially received in accordance with the present invention. The required parameters for reshaping the geometric shape of first projection surface G' are then extracted from the distance information. They are used to reshape the geometric shape of the first projection surface. Subsequently thereto, texture information is computed in the form of coordinates for each polygon/vertex of first projection surface G'. This texture information in the form of coordinates is transferred to second projection surface G. In conclusion, using the computed texture information, an image from second projection surface G is rendered.

Although the present invention is described here on the basis of a surround view system of a vehicle, the method according to the present invention may also be used in other areas in which single images are assembled to form a common image.

In addition to the above written disclosure, reference is also explicitly hereby made to the disclosure of FIG. 1 through 4.

What is claimed is:

1. A method for assembling single images recorded by a camera system from different positions, to form a common image, the method comprising:
   recording, by a camera system from different positions, a plurality of single images;
   providing, by an electronic processing unit, a first projection surface having a first geometric shape and a second projection surface having a second geometric shape, every point of the first projection surface having an associated point on the second projection surface, wherein each of the first projection surface and the second projection surface is a geometric construct in a virtual three-dimensional space, and wherein the second projection surface is spherical;
   acquiring, by the electronic processing unit from ultrasonic sensors, positional information that describes a configuration of objects shown in the single images relative to the camera system, and positional information that describes shapes of the objects relative to the camera system;
   reshaping, by the electronic processing unit, the first geometric shape of the first projection surface based on the acquired positional information that describes the configuration of the objects and based on the acquired positional information that describes the shapes of the objects;
   assigning, by the electronic processing unit after the reshaping, texture information pertaining to the single images to surface regions of the reshaped first projection surface, the surface regions including the points of the reshaped first projection surface;
   transferring, by the electronic processing unit after the assigning, the assigned texture information from the points of the reshaped first projection surface to the respective, associated points of the spherical second projection surface;
   producing, by the electronic processing unit after the transferring, the common image from a view of the spherical second projection surface using the transferred, assigned texture information; and
   displaying, by the electronic processing unit, the produced common image on a monitor.

2. The method of claim 1, wherein the first projection surface includes a plurality of polygons or primitives whose positions are each defined by a vector or a vertex.

3. The method of claim 1, wherein the single images form an image of an overlapping region that shows a common region in the surrounding field of the camera system.

4. The method of claim 1, wherein the positional information that describes a configuration of the objects and the positional information that describes the shapes of the objects are recorded concurrently with the single images.

5. The method of claim 1, wherein the camera system is surrounded by a surround view system of a vehicle.

6. The method of claim 1, wherein the single images are recorded with an offset in time by the same camera of the camera system.

7. The method of claim 1, wherein each of the first projection surface and the second projection surface includes a plurality of polygons and associated vertices.

8. The method of claim 1, wherein the camera system includes cameras mounted on a vehicle, the single images being images of surroundings of the vehicle, and the monitor is in an interior of the vehicle.

9. The method as recited in claim 8, wherein the cameras and the distance sensors are part of a surround view system of the vehicle.

10. An image processing unit, comprising:
    an image processing arrangement configured to assemble single images recorded by a camera system from different positions, to form a common image, by performing the following:
    recording, by a camera system from different positions, a plurality of single images;
    providing, by an electronic processing unit, a first projection surface having a first geometric shape and a second projection surface having a second geometric shape, every point of the first projection surface having an associated point on the second projection surface, wherein each of the first projection surface and the second projection surface is a geometric construct in a virtual three-dimensional space, and wherein the second projection surface is spherical;
    acquiring, by the electronic processing unit from ultrasonic sensors, positional information that describes a configuration of objects shown in the single images relative to the camera system, and positional information that describes shapes of the objects relative to the camera system;
    reshaping, by the electronic processing unit, the first geometric shape of the first projection surface based on the acquired positional information that describes the configuration of the objects and based on the acquired positional information that describes the shapes of the objects;
    assigning, by the electronic processing unit after the reshaping, texture information pertaining to the single images to surface regions of the reshaped first projection surface, the surface regions including the points of the reshaped first projection surface;
    transferring, by the electronic processing unit after the assigning, the assigned texture information from the points of the reshaped first projection surface to the respective, associated points of the spherical second projection surface;
    producing, by the electronic processing unit after the transferring, the common image from a view of the spherical second projection surface using the transferred, assigned texture information; and
    displaying, by the electronic processing unit, the produced common image on a monitor.

11. The image processing unit of claim 10, wherein the first projection surface includes a plurality of polygons or primitives whose positions are each defined by a vector or a vertex.

12. The image processing unit of claim 10, wherein each of the first projection surface and the second projection surface includes a plurality of polygons and associated vertices.

13. The image processing unit of claim 10, wherein the camera system includes cameras mounted on a vehicle, the single images being images of surroundings of the vehicle, and the monitor is in an interior of the vehicle.

14. The image processing unit of claim 13, wherein the cameras and the distance sensors are part of a surround view system of the vehicle.

15. A non-transitory computer readable medium having a computer program, which is executable by a processor, comprising:
- a program code arrangement having program code for assembling single images recorded by a camera system from different positions, to form a common image, by performing the following:
  - recording, by a camera system from different positions, a plurality of single images;
  - providing, by an electronic processing unit, a first projection surface having a first geometric shape and a second projection surface having a second geometric shape, every point of the first projection surface having an associated point on the second projection surface, wherein each of the first projection surface and the second projection surface is a geometric construct in a virtual three-dimensional space, and wherein the second projection surface is spherical;
  - acquiring, by the electronic processing unit from distance sensors, positional information that describes a configuration of objects shown in the single images relative to the camera system, and positional information that describes shapes of the objects relative to the camera system;
  - reshaping, by the electronic processing unit, the first geometric shape of the first projection surface based on the acquired positional information that describes the configuration of the objects and based on the acquired positional information that describes the shapes of the objects;
  - assigning, by the electronic processing unit after the reshaping, texture information pertaining to the single images to surface regions of the reshaped first projection surface, the surface regions including the points of the reshaped first projection surface;
  - transferring, by the electronic processing unit after the assigning, the assigned texture information from the points of the reshaped first projection surface to the respective, associated points of the spherical second projection surface;
  - producing, by the electronic processing unit after the transferring, the common image from a view of the spherical second projection surface; and
  - displaying, by the electronic processing unit, the produced common image on a monitor.

16. The non-transitory computer readable medium of claim 15, wherein each of the first projection surface and the second projection surface includes a plurality of polygons and associated vertices.

17. The non-transitory computer readable medium of claim 15, wherein the camera system includes cameras mounted on a vehicle, the single images being images of surroundings of the vehicle, and the monitor is in an interior of the vehicle.

18. The non-transitory computer readable medium as recited in claim 17, wherein the cameras and the distance sensors are part of a surround view system of the vehicle.

* * * * *